United States Patent Office 2,946,750
Patented July 26, 1960

2,946,750

LUBRICATING GREASES THICKENED WITH REACTION PRODUCTS OF ARYLAMINE DYES WITH PHOSPHOMOLYBDIC, PHOSPHOTUNGSTIC AND PHOSPHOTUNGSTOMOLYBDIC ACIDS

Norman R. Odell, Fishkill, and Joseph F. Lyons, Wappingers Falls, N.Y., assignors to Texaco Inc., a corporation of Delaware No Drawing. Filed Aug. 13, 1957, Ser. No. 677,821

10 Claims. (Cl. 252—33)

This invention relates to lubricating greases and to a novel class of thickening agents therefor. More particularly, it relates to greases thickened with reaction products of arylamine compounds with heteropoly acids of the class of phosphomolybdic, phosphotungstic and phosphotungstomolybdic acids.

Pigments of the class which are known commercially as PMA, PTA and PTMA pigments are formed by precipitating cationic dyes, containing a chemically reactive arylamine group, with phosphomolybdic, phosphotungstic and phosphotungstomolybdic acids. The pigments of this class are high melting solids, characterized by greatly improved stability to heat and light, insolubility in both oil and water, and the required wetting properties for use in printing inks, wherein they are principally employed. We have now found that these compounds constitute a valuable class of grease thickening agents, forming greases of very special properties, including particularly high extreme pressure properties not obtained with other grease thickening agents of the prior art.

The cationic dyes which are precipitated by the heteropoly acids to form the grease thickening agents of this invention are colored salts of aromatic compounds containing a p-aminoaryl chromophore group attached to a central carbon atom of the molecule. This group includes principally diphenylmethane, triarylmethane, xanthene and thiazole derivatives containing an amine or substituted amine group attached to an aryl group in a position para to the central carbon atom of the molecule. The compounds are employed in the reaction in the form of their water-soluble salts, such as their chlorides, sulfates or oxalates.

While the structure of these compounds is not definitely known, it is generally considered that it involves a quinonimine group, or a resonance hybrid involving such a group, and the compounds are usually represented by formulas showing this type of structure. For convenience herein, the compounds are represented by formulas of this type, as employed by the Color Index.

The characteristic group which these compounds contain is represented by the following formula, based upon the formulas by which they are conventionally designated:

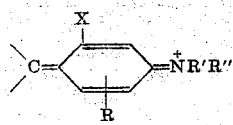

wherein R is hydrogen or a lower aliphatic hydrocarbon substituent group such as a $C_{1-4}$ alkyl group, X may be hydrogen or a substituent group such as R or a divalent substituent group such as oxygen, sulfur, =NH, =NR, etc., forming a fused ring including C with a different aryl group in the molecule, and R' and R" may be hydrogen, hydrocarbon groups or substituted hydrocarbon groups, at least one of the groups represented by R' and R" preferably being a hydrocarbon or substituted hydrocarbon group. The hydrocarbon groups may be alkyl, aryl, alkaryl or aralkyl groups. Substituents which they may contain, and which may be present elsewhere in the molecule in hydrocarbon groups attached to C include —OH, —OR, —NH$_2$, —NHR, —NR$_2$, —COOH, —COOR, —COOM, —NO$_2$, —SO$_3$H, halogens, etc., where R is a hydrocarbon or substituted hydrocarbon group and M is a metal or the hydrogen equivalent thereof.

The compounds of the above class include chiefly derivatives of p-aminotriphenylmethane, p-aminodiphenylnaphthylmethane, 6-amino-9-phenylxanthene and 2-p-aminophenyl benzothiazole. The preferred compounds are represented by the following structural formulas:

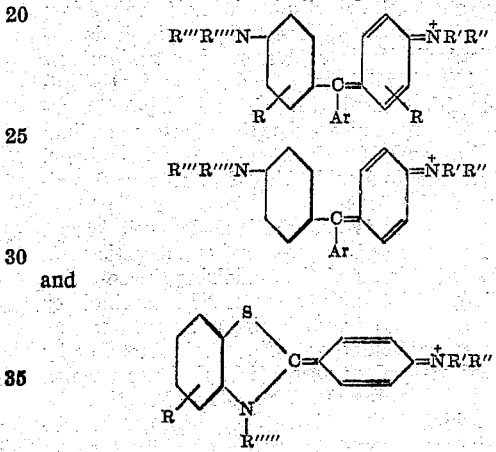

and wherein Ar is a phenyl or naphthyl group or a substituted phenyl or naphthyl group, R and R'''' are lower alkyl groups, containing from 1 to about 4 carbon atoms, or hydrogen, and R', R", R''' and R'''' are hydrogen or hydrocarbon groups, which may be alkyl, aryl or substituted alkyl or aryl groups, at least one of the groups represented by R' and R" preferably being a hydrocarbon or substituted hydrocarbon group. Substituents may be any of those described above.

Familiar examples of the preferred compounds, which are commercially available, include the following (C.I. referring to the Color Index number): Malachite Green (salt of tetramethyldiaminocarbinol—C.I. 657); Crystal Violet (salt of hexamethyltriaminocarbinol—C.I. 681); Victoria Blue B (salt of tetramethylphenyltriamino-diphenyl-α-naphthylcarbinol—C.I. 729); Patent Blue V (salt of the disulfonic acid of M'-hydroxy-tetraethyldiamino-triphenyl-carbinol anhydride—C.I. 712); Setoglaucine (salt of p,p'-tertamethyldiamino-o-chloro-triphenylcarbinol anhydride—C.I. 658); Erioglaucine A (salt of dibenzyldiethyl-diamino-triphenylcarbinol trisulfonic acid anhydride—C.I. 671); Rhodamine 5G (3,6-dimethyldiamino-2.7-dimethyl-9-o-chloro-phenyl-xanthenyl chloride —C.I. 746); Rosamine (tetramethyl-diamino-phenyl-xanthenyl chloride—C.I. 745); and Thioflavine T (salt of p-dimethylaminophenyl-3,6-dimethyl - benzo-thiazole—C.I. 815).

Additional examples of suitable compounds of this class include the following: Hydrochloride of p-aminotriphenylcarbinol anhydride; hydrochloride of p,p-diaminotriphenylcarbinol anhydride; zinc double chloride of ethylhexamethyl-pararosaniline bromide; zinc double chloride of p,p'-dimethyldiamino-2,5-dichloro-triphenylcarbinol anhydride; hydrochloride of diethyldiamino-di-o-tolyl-o'-chlorophenylcarbinol anhydride; hydrochloride of pentamethyl pararosaniline; hydrochloride of pentamethylbenzyl-pararosaniline; hydrochloride of triphenyl-pararosaniline; hydrochloride of triamino-tritolylcarbinol anhydride; zinc chloride of tetramethyldiamino-diphenyl-p'-nitro-tolylcarbinol anhydride; zinc double chloride of heptamethyl-rosaniline chloride; hydrochloride of pentamethyl-α-naphthyl-pararosaniline; sodium and calcium salts of dibenzyldiethyl-diamino-triphenyl-carbinol trisulfonic acid anhydride; sodium salt of dibenzyldiethyldiamino-o'-chloro-triphenylcarbinol dissulfonic acid anhydride; sodium salt of dibenzyltetraethyl-triamino-triphenylcarbino disulfonic acid anhydride; sodium salt of triphenyltriamino-triphenylcarbinol sulfonic acid; tetramethyldiamino - p' - hydroxy-triphenylcarbinol-m'-carboxylic acid anhydride; tetramethyldiamino-triphenylcarbinol-m'-carboxylic acid anhydride; sodium salt of dibenzyldiethyldiamino-o'-chloro-m'-nitro-triphenylcarbinol disulfonic acid anhydride; hydrochloride of tetramethylethyltriamino-diphenyl-α-naphthylcarbinol anhydride; hydrochloride of dimethylphenyldiamino-diphenyl-α-naphthylcarbinol anhydride; sodium salt of tetramethyldiamino-diphenyl-p-naphthylcarbinol disulfonic acid anhydride; sodium salt of tetramethyldiamino-diphenyl-β-hydroxynaphthylcarbinol disulfonic acid anhydride; sodium salt of tetramethyldiaminodiphenyl-α-naphthylcarbinol disulfonic acid anhydride; ethyl ester of 3-methoxy-6-dimethylamino-9-o-carboxyphenyl-xanthenyl chloride; sodium salt of 3-6-tetraethyldiamino-9-sulfo-phenyl-xanthenyl sulfonate; and the hydrochloride of 2-hydroxy-2-p-dimethylaminophenyl indane.

The above compounds are obtained by well known methods, as for example by condensing an aromatic aldehyde with an arylamine, and then oxidizing the so-called "leuco base" formed to the corresponding carbinol, or "color base," by means of an oxidizing agent such as lead dioxide, manganese dioxide or sodium dichromate, or by the reaction of arylamines with Michler's ketone which forms the color bases directly. The salts are obtained by treating the carbinols with acids. They may also be prepared by various other methods without passing through the carbinol stage, as for example by the so-called phosgene method, which produces the salts directly.

The reaction between the dye and the heteropoly acid may be carried out by merely mixing together a solution of the heteropoly acid and the dye, preferably in the form of its water-soluble salt in aqueous solution as described, for example, in U.S. 1,232,551, U.S. 1,232,552, U.S. 1,378,882 and U.S. 1,653,851. The heteropoly acid solution may be formed by dissolving a mixture of phosphoric acid or water-soluble salt thereof and a water soluble molybdate or tungstate salt, or a mixture of the two, in water, and then adding a strong acid such as hydrochloric acid to the solution to give a pH below about 7, and preferably below about 5. Instead of employing the dye in the form of a salt, the carbinol may be employed, preferably in solution in an organic solvent. Where the dye contains an acid group such as a sulfo or carboxy group, the reaction may be carried out with the addition of a soluble salt of an alkaline earth metal, such as calcium or barium chloride, in the presence or absence of a substrate such as aluminum hydrate, blanc fixe, etc., as described, for example, in U.S. 1,378,418.

The precipitates formed by the reaction of the heteropoly acids with the arylamine dyes may be salts, formed by displacing the anion of the water-soluble salt with the heteropoly acid anion, or they may be absorption complexes or mixtures of salts and absorption complexes, as discused, for example, by Pratt "Chemistry and Physics of Organic Pigments" (1947), pages 133–79. They comprise the heteropoly acid component and dye component in a ratio from about 1:1 to about 1:7, and the heteropoly acid component may be either the form having a 1:18 or a 1:24 $P_2O_5$—$MO_3$ ratio, or a mixture of these two forms having a $P_2O_5$—$MO_3$ ratio between 1:18 and 1:24, where M is either tungsten or molybdenum or a mixture of the two. The reaction product may also contain smaller amounts of the reaction products of the dye with phosphoric acid and with tungstic or molybdic acid alone.

The reaction products described above are employed as grease thickening agents in finely divided form, ordinarily in the form of particles below about 5 microns in diameter, and preferably below 2 microns in diameter, which may be obtained either by suitably controlling the reaction conditions in their preparation or by fine grinding. They may be employed either in pure form or admixed with or precipitated upon inorganic materials such as alumina, titania, blanc fixe, etc., commonly employed as substrates and extenders for organic pigments. Where such materials are merely mixed with the pigment, they are generally employed in amounts less than about 25 percent by weight, and preferably in amounts less than about 10 percent by weight based on the weight of the composition. However, when the inorganic material is employed as a substrate, the amount present is not critical provided that sufficient of the pigment is present to substantially cover its surface, and the composition may comprise relatively high amounts, such as up to about 50 percent by weight, of such inorganic material.

The greases of this invention comprise essentially lubricating oils admixed with sufficient amounts of thickening agents of the type described above to impart at least substantial thickening. Ordinarily, the composition will contain from about 5 to about 45 percent by weight of the thickening agent, and preferably 15 to 35 percent by weight based on the weight of the composition.

The lubricating oils employed in these greases may be any suitable oils of lubricating characteristics ordinarily employed in lubricating greases, including the conventional mineral lubricating oils, synthetic oils obtained by various refinery processes, such as cracking and polymerization, and other synthetic oleaginous compounds, such as high molecular weight ethers, esters, silicones, etc. Suitable mineral oils include paraffinic and naphthenic oils having viscosities in the range from about 80 seconds Saybolt Universal at 100° F. to about 225 seconds Saybolt Universal at 210° F., and preferably having viscosities in the range from about 100 to about 600 seconds Saybolt Universal at 100° F. Synthetic oils, including particularly the dicarboxylic acid esters, may be employed very advantageously to produce greases for operations at elevated temperatures in the range from about 300° F. to about 400° F.

A particularly suitable class of dicarboxylic acid ester oils are those disclosed by R. T. Sanderson in U.S. 2,628,974, obtained by reacting a dibasic aliphatic acid with a glycol and end-blocking the reaction product with a monohydric aliphatic alcohol or a monocarboxylic aliphatic acid. The preferred materials of this character are products obtained by reacting a mono- or polyalkylene glycol with a dicarboxylic acid and a monohydric alcohol, represented by the formula $$R_2\text{—OOC—}R_1\text{—COO—}(R\text{—OOC—}R_1\text{—COO})_x\text{—}R_2$$

where R is an aliphatic hydrocarbon group or an aliphatic ether group containing from 4 to 12 carbon atoms, $R_1$ and $R_2$ are aliphatic hydrocarbon groups containing from 1 to 12 carbon atoms, and x is an integer from 1 to 5. Preferably, R is an aliphatic hydrocarbon group or an aliphatic ether group containing from 6 to 12 carbon atoms in branched chain arrangement, $R_1$ is an alkylene group containing from 7 to 8 carbon atoms, $R_2$ is an alkyl group containing from 4 to 9 carbon atoms in branched chain arrangement and x is 1 or 2. An ester of this type may very advantageously comprise from about 20 up to 100 percent of the oil component of the grease, the remainder being a mineral oil or other oil of a different type.

Additives of the usual types may be employed in these greases, such as, for example, oxidation inhibitors, corrosion inhibitors, tackiness agents, extreme pressure agents, etc. Oxidation inhibitors of the amine type, such as diphenylamine, α-naphthylamine, β-naphthylamine and diphenyl-p-phenylenediamine. The inhibitor combination described in U.S. 2,663,691, comprising about 0.1 percent to about 8 percent, and preferably about 0.5 percent to about 2.0 percent by weight, based on the weight of the grease, of N,N'-diphenyl-p-phenylene diamine dissolved in about three times its weight of tricresyl phosphate, may very advantageously be employed. Also, additional thickening agents may be employed, such as other finely divided solids of various types and metal soaps of high molecular weight fatty acids such as are conventionally employed in lubricating greases.

The grease preparation may be carried out by merely mixing together the thickener and any additives employed with the lubricating oil, employing a means suitable for accomplishing a thorough dispersion of the thickener and additives in the lubricating oil base, such as milling in a colloid mill or in a paint mill. The mixing may be carried out at ordinary temperatures or at elevated temperatures up to about 300° F. if desired, in order to dissolve the additives.

The following examples are given for the purpose of more fully disclosing the invention.

*Example I*

Grease thickened with a reaction product represented by the formula

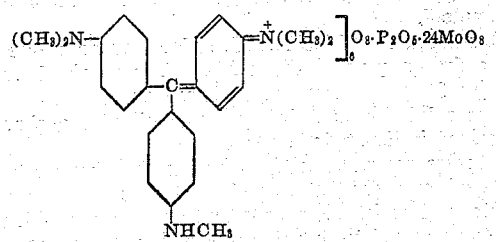

The above reaction product is obtained by precipitating Methyl Violet B (hydrochloric acid salt of pentamethyl-triaminotriphenylcarbinol) with phosphomolybdic acid in acid solution, as described by W. W. Williams and J. W. Conley, "Industrial and Engineering Chemistry," vol. 47, p. 1507–1510 (August, 1955). The method consists essentially in adding a phosphomolybdic acid solution, containing $P_2O_5$ and $MoO_3$ in a ratio of about 1:24 and acidified with hydrochloric acid to a pH of 3–4, to a water solution containing about 1 percent of the dye and acidified with acetic acid to a pH of 2.3–3.5, employing about 1 mol of the dye to about 6 mols of the phosmolybdic acid to about 6 mols of the dye. After the addition is complete the solution is heated and additional phosphomolybdic acid solution added to complete the reaction. The reaction product thus obtained is found by analysis to have a chemical composition corresponding to a compound of the formula given above.

The grease preparation is carried out by mixing a lubricating oil and solid thickener in suitable proportions to give a grease of the desired grade and then milling the mixture, advantageously employing a Premier Colloid mill with two passes at 0.002 inch clearance. A smooth N.L.G.I. No. 2 grade grease having a dropping point above 500° F. is obtained by employing 30 percent by weight, based on the composition, of the solid thickener in a refined naphthene base distillate oil having a Saybolt Universal viscosity of about 310 seconds at 100° F.

*Example II*

Grease thickened with a reaction product represented by the formula

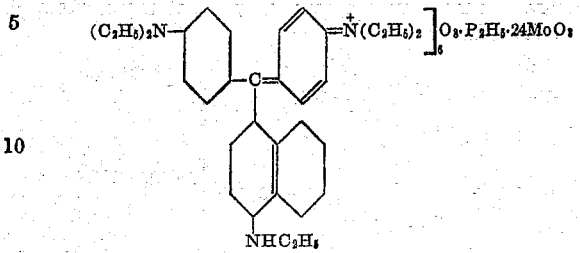

The reaction product is obtained by precipitating Victoria Pure Blue BO (salt of pentaethyltriaminonaphthylcarbinol) with phosphomolybdic acid under the reaction conditions described in Example I. It is employed in the form of particles about 0.5–1 microns in diameter and having a measured surface area of 60 square meters per gram.

The grease preparation is carried out by mixing the solid thickener and lubricating oil in suitable proportions by weight and milling as described in Example I.

A high temperature ball and roller bearing grease of N.L.G.I. No. 3 grade comprises 25 percent by weight based on the composition of the solid thickener in a synthetic ester lubricating oil mixed with about 5 percent by weight of a refined paraffin base distillate oil having a Saybolt Universal viscosity at 100° F. of about 335 seconds, and containing 1 percent of diphenyl-p-phenylenediamine and 3 percent by weight of tricresyl phosphate as inhibitors. The synthetic ester is a reaction product obtained by reacting together sebacic acid, 2-ethylhexane 1,3-diol and 2-ethylhexanol in about a 2:1:2 ratio, respectively, and consists predominantly of the compound

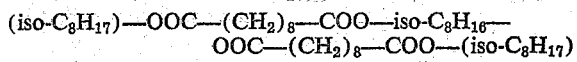

*Example III*

Grease thickened with a reaction product represented by the formula

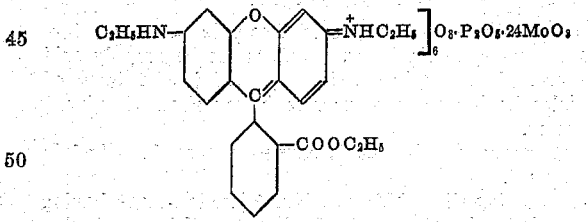

The reaction product is obtained by precipitating 3,6-diethyldiamino - 9 - o - carboxy - ethylphenyl - xanthenyl chloride with phosphomolybdic acid under the reaction conditions described in Example I.

The grease preparation is carried out as described in Example I.

An N.L.G.I. No. 2 grade grease of good texture and appearance is obtained by employing 30 percent by weight based on the composition of the solid thickener in a mineral lubricating oil of the character described in Example I.

*Example IV*

A high temperature grease is obtained by employing the solid thickener described in Example III in a silicone oil as the lubricating oil component. The silicone oil is a methylchlorophenyl silicone polymer having a molecular weight of about 3,000 and containing about 7 percent by weight of chlorine.

The grease preparation is carried out as described in Example I.

An N.L.G.I. No. 1 grade grease of good texture and appearance and a dropping point of about 450° F. is

Example V

Grease thickened with a reaction product represented by the formula

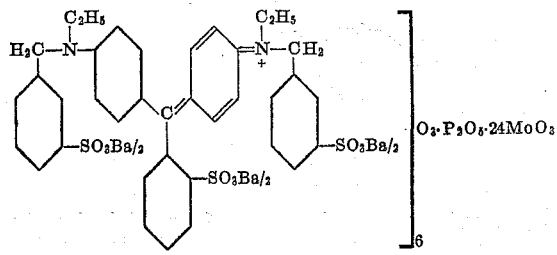

The reaction product is obtained by precipitating Erioglaucine A with phosphomolybdic acid and barium chloride. The reaction is carried out under the reaction conditions described in Example I, except that a water solution of barium chloride in the stoichiometric proportion is added during the addition of the heteropoly acid solution.

The grease preparation is carried out as described in Example I.

A smooth red N.L.G.I. No. 1 grade grease having a dropping point above 350° F. is obtained by employing 30 percent by weight, based on the composition, of the solid thickener in a mineral lubricating oil of the character described in Example I.

Example VI

Grease thickened with a reaction product represented by the formula

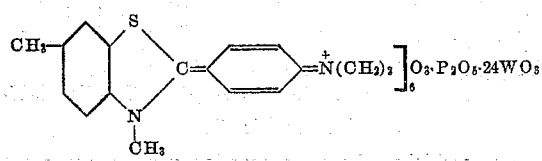

The above reaction product is obtained by precipitating Thioflavine T with phosphotungstic acid under the reaction conditions described in Example I, except that phosphotungstic acid is employed as the heteropoly acid reactant. The precipitate is employed in the form of particles having an average size below about 1 micron diameter.

The grease preparation is carried out as described in Example I.

A smooth yellow N.L.G.I. No. 1 grade grease having a dropping point above 350° F. is obtained by employing 30 percent by weight, based on the composition, of the solid thickener in a mineral oil of the character described in Example I.

Example VII

Grease thickened with a reaction product represented by the formula

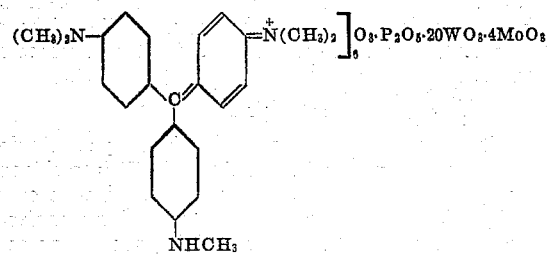

The above reaction product is obtained by precipitating Methyl Violet B with a solution of heteropoly acid consisting of 80 percent phosphotungstic and 20 percent phosphomolybdic acids, under the reaction conditions described in Example I. The precipitate is employed in the form of particles of about 0.5 to 1.5 microns diameter.

The grease preparation is carried out as described in Example I.

A smooth N.L.G.I. No. 2 grade grease having a dropping point above 500° F. is obtained by employing 30 percent by weight, based on the composition, of the solid thickener in a mineral lubricating oil of the character described in Example I.

Example VIII

Grease thickened with a reaction product represented by the formula

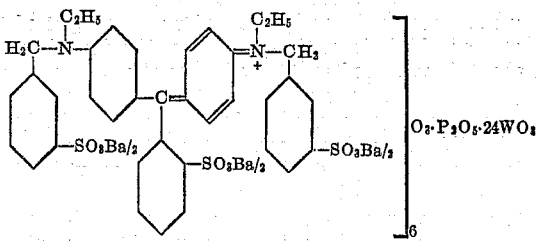

The reaction product is obtained by precipitating Erioglaucine A with phosphotungstic acid and barium chloride in the presence of aluminum hydrate as a carrier. The synthesis of the dye and its precipitation is carried out as described by A. S. Hester and C. H. Allen, Industrial and Engineering Chemistry, vol. 45, p. 1610-18 (1953), except that a solution of phosphotungstic acid in an amount corresponding to one mol of phosphotungstic acid to about 6 mols of the dye is added during the precipitation. The precipitate comprises the reaction product shown above with about 35 percent by weight of aluminum hydrate. It is employed in the form of particles of below about 2 microns diameter.

The grease preparation is carried out as described in Example I.

A smooth dark blue N.L.G.I. No. 0 grade grease having a dropping point above 500° F. is obtained by employing 30 percent by weight, based on the composition, of the solid thickener in a mineral oil of the character described in Example I.

Greases prepared as described in the above examples were of excellent texture and appearance and were very stable and resistant to separation of oil and thickener. They possessed very good lubricating properties generally, including good shear and oxidation resistance and low water sensitivity. In addition, they had very outstanding extreme pressure properties and high temperature performance properties. Table I below gives data which were obtained in extreme pressure tests carried out upon greases prepared as described in Examples I, III and V, in comparison with typical results in these tests obtained upon a solids thickened grease of the prior art. The latter was an N.L.G.I. No. 2 grade grease comprising a mineral lubricating oil of the same type as that employed in the examples thickened with 16.6 percent by weight of finely divided silica.

TABLE I

| Grease | Mean Hertz Load Seizure Load, Kg. | Four Ball Navy Wear, Microns per minute |
|---|---|---|
| Silica thickened | 29 | 13.2 |
| Example I | 52 | 5.9 |
| Example III | 76 | 7.5 |
| Example V | 103 | 4.8 |

The above tests are well known laboratory tests for determining the extreme pressure and anti-wear properties of lubricants. They are carried out as described for example in U.S. 2,600,056, col. 12, 1. 13-60, employing a test machine which comprises 4 steel balls in pyramid arrangement and lubricated at their points of contacts with the lubricant under test. The upper ball is rotated at a high speed in contact with the lower 3 balls while a load is applied to the system by means of a lever arm. The Mean Hertz Load is the load upon the lever arm which causes welding to the balls after 10 seconds of operation. The Navy Wear values represent the average diameters of the score marks upon the balls after 1 minute of operation with a weight of 10 kilograms applied to the lever arm.

As shown by the data, the greases of this invention were outstandingly superior in both their load carrying and antiwear properties to the solids thickened grease of the prior art containing no extreme pressure additives. They were also very outstandingly superior in their extreme pressure properties to soap thickened greases, which ordinarily have Mean Hertz Load values in about the range 20–25.

Table II below shows the high temperature performances properties of a grease prepared as described in Example II.

TABLE II

| Grease | High Temperature Performance Test, Hours at 400° F. |
|---|---|
| Example II | 313 |

The High Temperature Performance Test is a test for determining the stability and lubricating properties of greases at elevated temperatures and at high rotative speeds. It is carried out as described for example in U.S. 2,639,266, col. 7, l. 42, col. 8, l. 34, employing a test apparatus which comprises a steel spindle supported on ball bearings lubricated with the lubricant under test in an electrically heated housing. The test is carried out by rotating the spindle at 10,000 r.p.m. at the test temperature until the lubricant fails, which is indicated by rupture of a low amperage fuse in the motor circuit.

The 313 hours at 400° F. obtained with the grease of this invention is well in excess of the high temperature performance life obtained in this test with any solid thickened grease of the prior art prepared from a synthetic ester of the same type. For example, a grease which ran only 119 hours in this test at 400° F. was obtained by thickening this ester with copper phthalocyanine.

Table III below gives additional data which were obtained upon greases of the above examples in various standard tests, showing that they possess a combination of good shear and oxidation resistance for uninhibited greases, and low water sensitivity.

TABLE III

| Grease, Example | III | VIII |
|---|---|---|
| ASTM Working Stability Test: | | |
| ASTM Penetration at 77° F.: | | |
| After 60 strokes | 288 | 359 |
| After 100,000 strokes | 299 | 376 |
| ASTM Bomb Oxidation Test, 210° F. (100 hr.) Pressure drop, lbs | 3 | 7 |
| Dynamic Water Resistance Test Loss, Percent | 2.5 | 2.5 |

Obviously many modifications and variations of the invention, as hereinbefore set forth, may be made without departing from the spirit and scope thereof, and therefore only such limitations should be imposed as are indicated in the appended claims.

We claim:
1. A lubricating grease consisting essentially of a lubricating oil thickened to a grease consistency with a compound selected from the class represented by the following formulas:

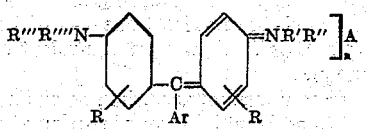

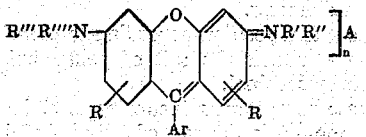

and

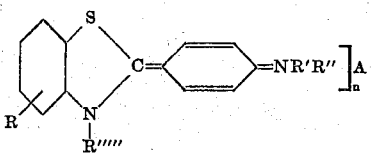

wherein Ar is chosen from the group consisting of phenyl, naphthyl and substituted phenyl and naphthyl groups, R and R''''' are chosen from the group consisting of hydrogen and lower alkyl groups, R', R'', and R''' and R'''' are chosen from the group consisting of hydrogen, hydrocarbon groups and substituted hydrocarbon groups, at least one group represented by R' and R'' being chosen from the group consisting of hydrocarbon and substituted hydrocarbon groups, A is the anion of a heteropoly acid chosen from the group consisting of phosphomolybdic, phosphotungstic and phosphotungstomolybdic acids, and n is a number from 1 to 7, inclusive, said compound being employed in the form of particles below about 5 microns in diameter.

2. A lubricating grease consisting essentially of a lubricating oil thickened to a grease consistency with a compound selected from the class represented by the following formulas:

wherein Ar is chosen from the group consisting of phenyl, naphthyl and substituted phenyl and naphthyl groups, R and R''''' are chosen from the group consisting of hydrogen and lower alkyl groups, R', R'', and R''' and R'''' are chosen from the group consisting of hydrogen, hydrocarbon groups and substituted hydrocarbon groups, at least one group represented by R' and R'' being chosen from the group consisting of hydrocarbon and substituted hydrocarbon groups, and A is the anion of a heteropoly acid chosen from the group consisting of phosphomolybdic, phosphotungstic and phosphotungstomolybdic acids, said compound being employed in the form of particles below about 5 microns in diameter.

3. A grease composition according to claim 2 wherein the said lubricating oil comprises in major proportion at least a high molecular weight polyester oil.

4. A grease composition according to claim 2 wherein the said lubricating oil is a silicone polymer oil.

5. A grease composition according to claim 2 wherein the said compounds have at least one —$SO_3M$ substituent group wherein M is the hydrogen equivalent of an alkaline earth metal.

6. A grease composition according to claim 2 wherein the said compound is in the form of particles below about 2 microns in diameter.

7. A grease composition according to claim 2 wherein the said compound is the salt of pentaethyltriaminodiphenyl naphthylcarbinol.

8. A grease composition according to claim 2 wherein the said compound is the salt of 3,6-diethyldiamino-9-o-carboxyethylphenyl xanthene.

9. A grease composition according to claim 2 wherein the said compound is the salt of pentamethyltriaminotriphenylcarbinol.

10. A grease composition according to claim 2 wherein the said compound is the salt of dibenzyldiethyldiaminotriphenylcarbinol containing three —$SO_3M$ groups, wherein M is the hydrogen equivalent of an alkaline earth metal.

References Cited in the file of this patent

UNITED STATES PATENTS

| | | |
|---|---|---|
| 1,458,542 | Plauson | June 12, 1923 |
| 2,099,689 | Holzach et al. | Nov. 23, 1937 |
| 2,140,248 | Retter et al. | Dec. 13, 1938 |
| 2,597,018 | Merker et al. | May 20, 1952 |